Dec. 7, 1937.  R. H. GUINZBURG  2,101,252
APPARATUS FOR MOLDING AND ORNAMENTING RUBBER ARTICLES
Filed Aug. 14, 1935
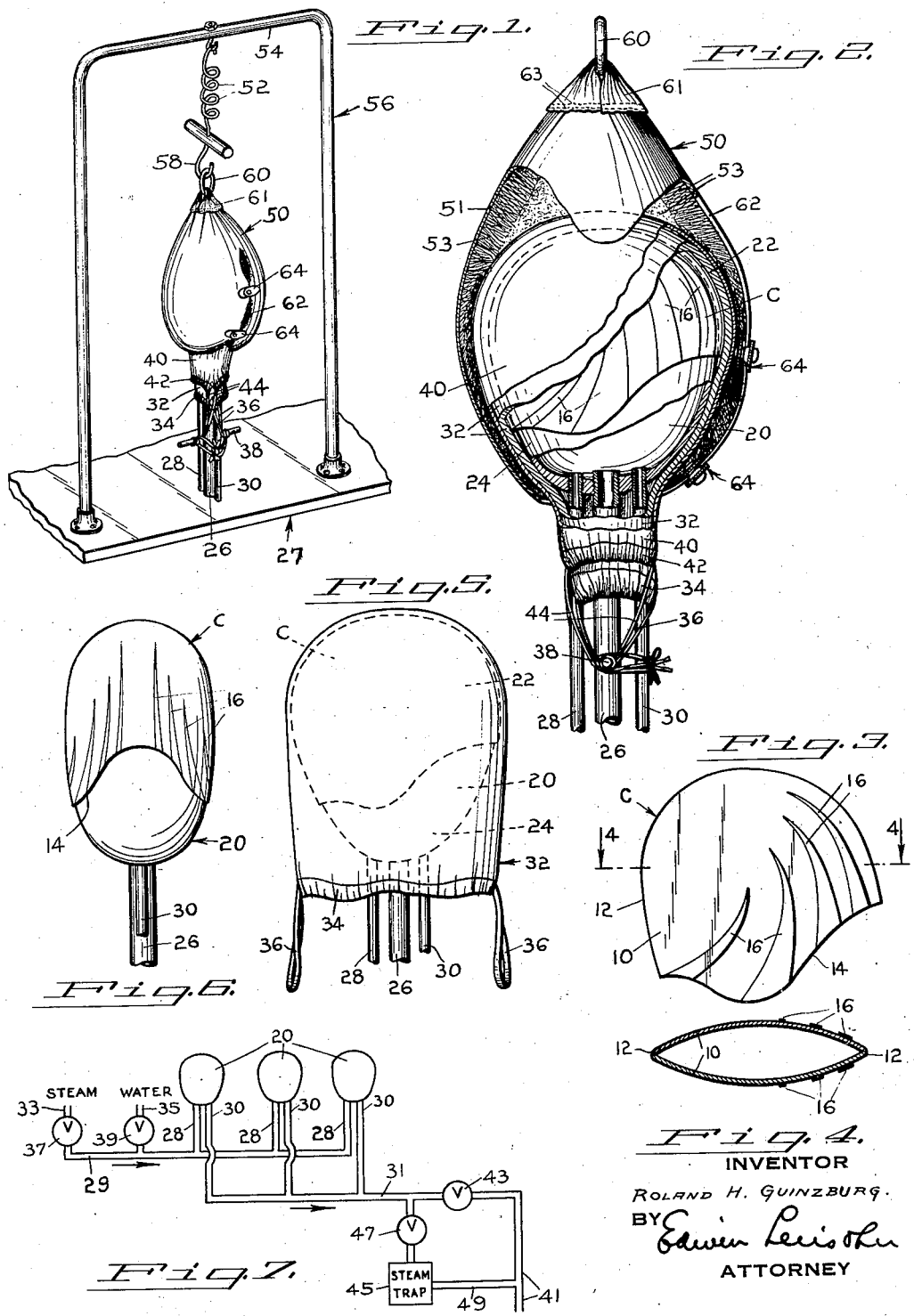
INVENTOR
ROLAND H. GUINZBURG.
BY Edwin Lewisohn
ATTORNEY Patented Dec. 7, 1937

2,101,252

UNITED STATES PATENT OFFICE 2,101,252

APPARATUS FOR MOLDING AND ORNAMENTING RUBBER ARTICLES

Roland H. Guinzburg, Flushing, N. Y., assignor to I. B. Kleinert Rubber Company, New York, N. Y.

Application August 14, 1935, Serial No. 36,140

14 Claims. (Cl. 18—19)

The present invention relates to the art of making hollow rubber articles, such as bathing caps, bathing shoes, hot water bottles, ice bags, etc., and more particularly to apparatus for molding and ornamenting such articles and forming relief designs or patterns thereon.

One object of the invention is to provide an improved apparatus for molding hollow rubber articles from unvulcanized or partly vulcanized sheet rubber.

Another object of the invention is to provide an improved apparatus for ornamenting hollow rubber articles made from sheet rubber and for forming relief designs or patterns thereon while molding the sheet rubber to the desired shape.

A further object is to provide a form for a vulcanizable object with a removable and flexible member for causing the object to conform to the form throughout the extent of the object positioned thereon.

A further object is to provide a form for a vulcanizable object having a removable and flexible pattern-carrying member for producing relief patterns on the object positioned on the form with means to cause the flexible pattern-carrying member to exert substantially uniform pressure over the entire surface of the vulcanizable object positioned on the form.

A yet further object is generally to improve the art of molding and/or ornamenting hollow articles made from sheet rubber.

The above objects of the invention and other objects ancillary thereto will best be understood from the following description with reference to the accompanying drawing.

In the drawing:

Fig. 1 is a perspective view of the apparatus in its final operative condition for treating the rubber article according to the present invention;

Fig. 2 is a side view, partly in elevation and partly in section, of the form and its associated parts illustrating their relation to each other and to the rubber article;

Fig. 3 is a plan view of a bathing cap as preliminarily defined from unvulcanized sheet rubber;

Fig. 4 is a section on the line 4—4 of Fig. 3, showing the cap partly opened;

Fig. 5 is a side view of the form showing the cap and a part of the apparatus which cooperates with the form;

Fig. 6 is a front view of the form and a finished cap thereon;

Fig. 7 is a diagrammatic view of a multi-form apparatus embodying the present invention.

The present apparatus is utilized primarily for molding and ornamenting rubber articles preliminarily defined from unvulcanized or partly vulcanized sheet rubber. For convenience in reference, such sheet rubber will be described as unvulcanized. In Figs. 3 and 4, there is shown a bathing cap C comprising two flat layers 10 of unvulcanized rubber seamed together at their peripheral edges 12 and open at their bottom edges 14. The cap in this condition is produced by subjecting two superposed flat sheets of unvulcanized rubber to the action of a seaming and cutting die which simultaneously cuts the layers 10 to the shape illustrated herein, or to any other shape, and unites the peripheral edges thereof. When it is desired to ornament the cap in contrasting colors, strips 16 of unvulcanized rubber rendered tacky or adhesive are pressed onto the surface of the layers 10.

After the unvulcanized article here shown as a cap, is formed, preferably as above described, it is placed upon a hollow form 20 of iron, aluminum, or if any other rigid material having good heat conducting properties, and shaped to impart to the article the desired contour of the article. Thus, the form 20 is shaped to impart to the flat bathing cap, shown in Figs. 3 to 4, approximately the shape of the human head. Said form 20, while generally dome-shaped has surface portions of varying curvature such as a relatively wide curved upper portion 22 and a relatively narrow curved lower portion 24. It will be observed that the form has an intermediate portion which is larger than portions disposed closer to the ends of the form, the end portions which are thus smaller than said intermediate portion being constituted by the upper parts of said upper portion 22 and said lower portion 24, respectively, and said larger intermediate portion being disposed between said lower portion 24 and the upper part of said portion 22. The form 20 is rigidly supported at the upper end of a post 26 secured at its lower end to a frame or table 27. As here shown said post comprises a metal pipe threaded into the bottom of the form 20, as shown most clearly in Fig. 2. Metal pipes 28 and 30 are also threaded into the bottom of the form 20. The pipe 28 constitutes means to supply a heating medium, usually steam, to the form and the pipe 30 constitutes an outlet.

The cap C is caused to conform to the contour of the form 20 by means of a highly flexible detachable member 32 here shown in the form of a bag having an open mouth defined by a hem 34 provided with draw strings 36 by which the mouth of the bag can be gathered and closed about the lower part of form 20, the post 26, and the pipes 28 and 30. The post 26 is provided with a transverse pin 38 to which the draw strings 36 are tied after the member 32 is conformed under pressure to the contour of the cap C, said draw strings serving to draw and to hold said member 32 under pressure on the cap C. The member 32 constitutes a flexible design impression element or pattern-carrying member for forming in the unvulcanized cap C designs or relief patterns which become permanent when the cap is vulcanized. For this purpose, said member 32 is provided with a surface design corresponding with the design to be created on the surface of the cap C. Accordingly, the member 32 may be knitted, netted, crocheted, woven, or otherwise formed to produce the desired ornamental effect, and it will be understood that a large variety of designs can be obtained by utilizing different design impression elements.

An important characteristic of the member 32 is its high degree of flexibility which allows it to conform readily to the form and to the object positioned thereon free from folds or creases in order to obtain a good relief design on the article without forming unsightly marks or impressions therein.

After the design impression element 32 is applied to the cap C on the form and secured in pressure-exerting relation thereto as described above, another detachable and highly flexible member 40 preferably of the same bag-like construction as the member 32, is applied over the member 32 and is caused to conform to the contour of the latter and brought into pressure-exerting relation by gathering the hem 42 by means of draw strings 44 which are also tied to the pin 38 to releasably maintain said relation. The flexible member 40 is made of textile material closely knitted or woven from relatively fine threads. This flexible member 40 is advantageous especially when the design impression element has an open-work design or is loosely knitted or woven to produce a particular design. With such types of design impression elements, the member 40 confines the exterior surface of the cap to its proper extent and prevents excessive projection of the unvulcanized rubber of the cap through the openings in the design impression element particularly when the rubber is rendered soft by the heat utilized for vulcanization. Said member 40 is also used to advantage when the apparatus is used in connection with vulcanization under sand, as the close weave of the material from which the member 40 is made closes the openings in the design impression element and thereby prevents the sand from reaching the cap through said openings.

An important feature of the present invention resides in the provision of means for causing the design-impression element to exert the proper pressure on the cap C at and in the region of the relatively narrow portion 24 at the lower part of the form 20 in order to obtain a well defined design impression in the lower portion of the cap overlying said portions of the form. For this purpose, primarily, the flexible jacket 50 is provided. As shown most clearly in Fig. 1, the jacket 50 is positioned over the flexible member 40 and is caused to exert pressure on the design impression element and on the underlying portions of the cap C upwardly and inwardly toward the form 20 by the force of a tension spring 52 secured at one end to the top bar 54 of the frame 56 and provided with a hook 58 which engages a ring 60 at the top of said jacket. The jacket is constructed to be readily applied to and removed from the form and for this purpose it is open at the bottom and has a front opening 62 extending from the bottom to a point near the top, as shown more clearly in Figs. 1 and 2. Straps 64 are secured to said jacket adjacent the opening 62 and are provided with separable fastener elements, such as snap fastener elements, for engaging with complemental fastener elements on the opposite portions of the jacket. Besides constituting means for exerting pressure on the design impression element, the jacket 50 also has the function of a heat insulation device. For this reason said jacket is made of heat insulation material, specifically sheepskin, with the flesh side thereof 51 outside and the hair side 53 inside. The metal ring 60 is secured to the sheepskin jacket 50 by a strong textile cap 61 stitched thereto by lines of stitching 63.

After the jacket 50 is applied and the apparatus is in the condition illustrated in Fig. 1, with the cap C snugly and smoothly conforming to the contour of the form 20 and the several flexible members properly disposed as described above, the cap C is vulcanized whereby to set or make permanent the design formed therein by the design impression element and to make the cap elastic. This is accomplished in the present apparatus by admitting steam to the form 20 through the inlet pipe 28. The steam may pass continuously through the form during the period of vulcanization, exhausting through the outlet pipe 30. During this period the jacket 50 aids in obtaining a uniform vulcanization of the cap throughout its extent.

When vulcanization has been completed, the supply of steam to the form is cut off and, in order to rapidly cool the form 20 so that the vulcanized cap can be removed shortly after the supply of steam is cut off, cold water may be admitted to the form 20 and passed therethrough, preferably utilizing for this purpose the pipes 28 and 30 previously employed for conducting steam through the form. This operation will be understood from an inspection of Fig. 7. As here shown, the pipes 28 and 30 of a plurality of forms 20 are connected respectively to a supply header 29 and to an exhaust header 31. The supply header 29 is connected to a steam line 33 and to a water line 35 under the control of valves 37 and 39 respectively. The exhaust header 31 is connected directly to an exhaust pipe 41 under the control of a valve 43 and indirectly to said exhaust pipe 41 through a steam trap 45 under the control of a valve 47, said steam trap communicating with the exhaust pipe 41 through a branch pipe 49.

The operation of the apparatus illustrated in Fig. 7 is as follows:

After the caps are applied to the forms 20 and the companion members 32, 40 and 50 have been associated with each form and the cap applied thereto, as described above, so that each unit is in the assembled condition illustrated in Figs. 1 and 2, the valves 39 and 43 being closed, the valves 37 and 47 are opened to permit steam to pass through the forms 20 to the exhaust pipe 41 by way of the supply header 29, the inlet pipes 28, the exhaust pipes 30, the exhaust header 31, the steam trap 45, and the branch pipe 49. The forms 20 are thus heated and the caps are vulcanized. When vulcanization has been completed, the valves 37 and 47 are closed and the valves 39 and 43 are opened, thus cutting off the supply of steam and admitting water under pressure to the forms 20, thus cooling the latter. The water passes through the forms 20 to the exhaust pipe 41 by way of the inlet header 29, the inlet pipes 28, the outlet pipes 30, the exhaust header 31. After the forms 20 have been cooled sufficiently to permit the operator to work thereon, the valve 39 is closed to cut off the supply of cold water. Then, the members 50, 40 and 32 and the caps are removed from the forms. In the meantime, the water has drained from the forms into the exhaust pipe 41. The valve 43 is then closed and after another assembly of caps and members on the forms the steam, admitted to the forms 20 as described, will expel any water which has failed to drain from the forms and the pipes and headers connected thereto into the steam trap and from the latter to the exhaust pipe 41.

The herein disclosed method of ornamenting the articles in contrasting colors is claimed in my application Serial No. 36,141 entitled Method of making hollow rubber articles, filed August 14, 1935.

While I have shown and described the preferred embodiment of the present invention, it will be understood that certain changes in the construction and arrangement of parts may be made, and that, unless otherwise specified, certain parts may be used without others. Therefore, I do not wish to be limited to the precise constructions and arrangements herein disclosed except as may be required by the appended claims considered in connection with the prior art.

I claim:—

1. Apparatus for molding and vulcanizing vulcanizable objects comprising a form having a contour corresponding to the desired contour of the finished object, a first flexible member for reception over the form and the object positioned thereon and constructed to be capable of being pressed closely in engagement with the object when positioned on the form, and a second flexible member of sheet material for pressing said first flexible member in close engagement with said object substantially throughout the extent thereof.

2. Apparatus for ornamenting vulcanizable objects comprising a form having a contour corresponding to the desired contour of the finished object, a flexible member for reception over the form and the object positioned thereon and constructed to be capable of being pressed closely in engagement with the object when positioned on the form, and means for pressing said flexible member in close engagement with said object substantially throughout the extent thereof, said means comprising a jacket of sheet material removably positioned over said flexible member.

3. Apparatus for ornamenting vulcanizable objects comprising a form having a contour corresponding to the desired contour of the finished object, a flexible member for reception over the form and the object positioned thereon and constructed to be capable of being pressed closely in engagement with the object when positioned on the form, and means for pressing said flexible member in close engagement with said object substantially throughout the extent thereof, said means comprising a jacket removably positioned over said flexible member and resilient means for urging said jacket into pressure-exerting relation to said flexible member.

4. Apparatus for ornamenting vulcanizable objects comprising a form having a contour corresponding to the desired contour of the finished object, a flexible pattern-carrying member for reception over the form and the object positioned thereon and constructed to be capable of being pressed closely in engagement with the object when positioned on the form, and means for pressing said flexible pattern-carrying member in close engagement with said object substantially throughout the extent thereof, said means comprising a jacket of sheet material removably positioned over said pattern-carrying member.

5. Apparatus for ornamenting vulcanizable objects comprising a form having a contour corresponding to the desired contour of the finished object, a flexible pattern-carrying member for reception over the form and the object positioned thereon and constructed to be capable of being pressed closely in engagement with the object when positioned on the form, and means for pressing said flexible pattern-carrying member in close engagement with said object substantially throughout the extent thereof, said means comprising a jacket removably positioned over said pattern-carrying member, and resilient means for urging said jacket into pressure-exerting relation to said pattern-carrying member.

6. Apparatus of the kind described comprising a hollow form of heat conducting material for a vulcanizable object, means for supply a heating medium to said hollow form to vulcanize said object when positioned on the form, an insulation jacket of non-vulcanizable material removably positioned on said form over the object positioned thereon, said jacket having an end opening and a side opening, and means for fastening the jacket at said side opening, said jacket being removable from said form independently of and after the object is vulcanized.

7. Apparatus of the kind described comprising a hollow form of heat conducting material for a vulcanizable object, means for supplying a heating medium to said hollow form to vulcanize said object when positioned on the form, a flexible insulation jacket of non-vulcanizable material removably positioned on the form over the object, said jacket having an end opening and a side opening, means for fastening the jacket at said side opening, said jacket being removable from said form independently of and after the object is vulcanized, and means to force said jacket into pressure exerting relation to said object.

8. Apparatus for molding and vulcanizing rubber, pouch-forming articles such as rubber bathing caps, shoes and the like, including a form for insertion into the pouch of the unvulcanized article, the form having a shape to impart to the article the desired contour, a removable flexible member for reception over the form and the article positioned thereon, and a second removable and flexible member of sheet material for reception over the form and over the article and first flexible member positioned thereon, and means for releasably securing said second flexible member in position.

9. Apparatus for molding and vulcanizing sheet-rubber pouch-forming articles, such as bathing caps which have an end portion which is smaller in peripheral contour than the intermediate cap portion, said apparatus comprising a form corresponding to the desired contour of the finished article, an intermediate portion of said form being larger than portions disposed closer to ends of the form, a flexible member positioned thereon over the article and constructed to be capable of being pressed closely in engagement with the article when positioned on the form, and means for pressing said flexible member into close engagement with said article on the form including means for applying pressure thereto in opposite directions at said end portions of the form respectively.

10. Apparatus for molding and vulcanizing sheet-rubber pouch-forming articles, such as bathing caps which have an end portion which is smaller in peripheral contour than the intermediate cap portion, said apparatus comprising a form corresponding to the desired contour of the finished article, an intermediate portion of said form being larger than portions disposed closer to ends of the form, a flexible member positioned thereon over the article and constructed to be capable of being pressed closely in engagement with the article when positioned on the form, and means including a second flexible member of sheet material for pressing said first mentioned flexible member into close engagement with said article substantially throughout the extent thereof at said intermediate and end portions of the form.

11. Apparatus for molding and vulcanizing sheet-rubber pouch-forming articles, such as bathing caps which have an end portion which is smaller in peripheral contour than the intermediate cap portion, said apparatus comprising a form corresponding to the desired contour of the finished article, an intermediate portion of said form being larger than portions disposed closer to ends of the form, a flexible pattern member positioned thereon over the article and constructed to be capable of being pressed closely in engagement with the article when positioned on the form, and means for pressing said flexible pattern member into close engagement with said article on the form including means for applying pressure thereto in opposite directions at said end portions of the form respectively.

12. Apparatus for molding and vulcanizing sheet-rubber pouch-forming articles, such as bathing caps which have an end portion which is smaller in peripheral contour than the intermediate cap portion, said apparatus comprising a form corresponding to the desired contour of the finished article, an intermediate portion of said form being larger than portions disposed closer to ends of the form, a flexible member positioned thereon over the article and constructed to be capable of being pressed closely in engagement with the article when positioned on the form, said form being hollow and composed of heat conducting material, a flexible heat insulating jacket removably positioned on the form over the article, and means to force said jacket into pressure exerting relation against said flexible member on the article.

13. Apparatus for molding and vulcanizing sheet-rubber pouch-forming articles, such as bathing caps which have an end portion which is smaller in peripheral contour than the intermediate cap portion, said apparatus comprising a form corresponding to the desired contour of the finished article, an intermediate portion of said form being larger than portions disposed closer to ends of the form, a flexible member positioned thereon over the article and constructed to be capable of being pressed closely in engagement with the article when positioned on the form, said form being hollow and composed of heat conducting material, a flexible heat insulating jacket removably positioned on the form over the article, and a tension spring connected to said jacket to resiliently urge the latter into pressure exerting relation against said flexible member on the article at one of the end-surface portions of the form.

14. Apparatus for ornamenting vulcanizable objects comprising a form having surface portions of varying curvature, a flexible pattern-carrying member that encloses said form and is provided with an exposed face having the pattern to be created on the vulcanizable object, and a flexible jacket removably positioned on the form over the article, said jacket having an end opening and a side opening, fastening means for said side opening, and means to force said jacket into pressure exerting relation to said pattern member over the article on the form.

ROLAND H. GUINZBURG.